United States Patent [19]

Minamisawa et al.

[11] 4,309,473

[45] Jan. 5, 1982

[54] NON-TACKY STRAND PREPREG COMPRISING A RESIN COMPOSITION CONTAINING A COMBINATION OF (1) A THERMOSETTING RESIN AND (2) A HIGH MOLECULAR WEIGHT EPOXY RESIN AND A PROCESS FOR FORMING AN ARTICLE FROM THE SAME

[75] Inventors: Tsuyoshi Minamisawa; Keitsugu Nohara, both of Shizuoka, Japan

[73] Assignee: Toho Beslon Co., Ltd., Tokyo, Japan

[21] Appl. No.: 100,614

[22] Filed: Dec. 5, 1979

[30] Foreign Application Priority Data

Dec. 8, 1978 [JP] Japan ................................. 53-151105

[51] Int. Cl.$^3$ .................... B32B 1/08; B32B 7/10; B32B 27/12; B32B 31/20
[52] U.S. Cl. ....................... 428/292; 156/189; 156/192; 156/307.5; 156/330; 242/7.21; 273/73 F; 273/80 R; 273/DIG. 7; 273/DIG. 23; 428/36; 428/294; 428/902; 525/31; 525/404; 525/407; 525/408; 525/451; 525/482; 525/484; 525/524; 525/526; 525/531; 525/930; 525/935
[58] Field of Search ................... 525/31, 930, 935; 428/902, 288, 292, 294; 156/330, 306

[56] References Cited

U.S. PATENT DOCUMENTS

| | | | |
|---|---|---|---|
| 3,578,489 | 5/1971 | Gelb | 428/902 |
| 3,637,618 | 1/1972 | May . | |
| 3,749,758 | 7/1973 | Gannon | 525/443 |
| 3,755,061 | 8/1973 | Schurb | 428/902 |
| 3,925,587 | 12/1975 | Park | 156/330 |
| 3,936,342 | 2/1976 | Matsubara et al. | 156/330 |
| 4,016,022 | 4/1977 | Browning | 156/330 |
| 4,171,626 | 10/1979 | Yates | 428/902 |

*Primary Examiner*—James C. Cannon
*Attorney, Agent, or Firm*—Sughrue, Mion, Zinn, Macpeak & Seas

[57] ABSTRACT

A strand prepreg which comprises (i) a resin composition comprising 100 parts by weight of thermosetting resin having a softening point of 60° C. or less and about 5 to 60 parts by weight of epoxy resin having a number average molecular weight of 5,000 or more and (ii) about 20 to 80% by volume strands of carbon fibers, glass fibers, aromatic polyamide fibers and the like, wherein the strands are impregnated with the resin composition.

18 Claims, No Drawings

NON-TACKY STRAND PREPREG COMPRISING A RESIN COMPOSITION CONTAINING A COMBINATION OF (1) A THERMOSETTING RESIN AND (2) A HIGH MOLECULAR WEIGHT EPOXY RESIN AND A PROCESS FOR FORMING AN ARTICLE FROM THE SAME

BACKGROUND OF THE INVENTION

1. Field of the Invention

The present invention relates to a strand prepreg comprising strands and a resin composition, which is flexible and not tacky, has excellent handling property, excellent moldability and excellent physical properties and can be easily produced.

2. Description of the Prior Art

Recently, various fiber reinforced plastics have been used in various fields for their light weight, high strength and high elasticity. Hitherto, moldings of fiber reinforced thermosetting resin composites have been produced using so-called prepreg sheets, tapes or fabrics wherein fibers are impregnated with thermosetting resins such as epoxy resins or unsaturated polyester resins, etc., stratified so that the fibers are aligned in the same or different directions, and molded by pressing under heat. The fibers in the prepregs generally are in the form of sheets in which the strands are arranged in rows in one direction or in the form of a fabric. Articles have also been prepared from the strand prepreg by filament winding in which a would prepreg is unwound to form the articles. Due to the tackiness of the prepreg, it is often difficult to unwind the prepreg and thus to obtain uniform products. Therefore, the prepregs are generally covered with a releasing paper during storage and before processing in order to prevent adhesion due to their mutual tackiness.

In view of these faults, studies have been made for obtaining prepregs which are not only non-tacky but also flexible from the viewpoint of being easily moldable. Particularly, studies have been made of prepregs which satisfy the above-described requirements paying attention to the molecular weight and the softening point of the resins. In order to prevent tackiness, the resin must have a relatively high molecular weight. However, a resin having such a high molecular weight does not have flexibility. On the other hand, it is necessary to reduce the softening point of the resin to some degree in order to impart flexibility. If the softening point is reduced, the resin becomes adhesive. Thus, it is difficult to obtain a practically useful resin having both relatively high molecular weight and a suitable softening point. Thus, as a result of repeated experiments in order to develop prepregs which are flexible but are not tacky, it has been found that a prepreg comprising strands and a special resin composition, namely a resin composition comprising a combination of two or more resins, is not tacky, is flexible and is easily stored without adhesion when rolled on a bobbin. Thus, the present invention has been accomplished.

SUMMARY OF THE INVENTION

An object of the present invention is to provide a strand prepreg having flexibility, good handling property and excellent moldability.

A further object of the present invention is to provide a strand prepreg which is sufficiently stable to variations in temperature and can be stored in a roll on a bobbin without using a releasing paper.

These objects of the present invention have been attained by a strand prepreg which comprises (i) a resin composition comprising 100 parts by weight of thermosetting resin having a softening point of about 60° C. or less and about 5 to 60 parts by weight of epoxy resin having a number average molecular weight of about 5,000 or more and (ii) about 20 to 80% by volume strands, wherein the strands are impregnated with the resin composition.

DETAILED DESCRIPTION OF THE INVENTION

The thermosetting resins used in the present invention have a softening point of about 60° C. or less. Preferably the thermosetting resins not only have a softening point of 60° C. or less but are also liquid at normal temperatures (20° to 25° C.). It is particularly preferred to use thermosetting resins having a softening point of 40° C. or less and a viscosity of 100 poise or more at 25° C. Measurement of the softening point is carried out by the mercury method. The mercury method is explained in H. A. Gardner, *Physical and Chemical Examination of Paints, Tarnishes, Lacquers and Colors,* 11th Edition, p. 468, H. A. Gardner Laboratory, (1950). It is possible to use epoxy resins, unsaturated polyester resins, phenol resins and polyimide resins which are generally used for producing prepregs as the thermosetting resin. In this case, not only one thermosetting resin but also a mixture of two or more thermosetting resins can be used in the present invention as long as the mixture has a softening point of 60° C. or less. If resins having a softening point of more than 60° C. are used, the resulting strand prepreg has inferior flexibility.

Representative examples of the thermosetting resins include:

Epoxy resins, for example, bisphenol A type resins obtained from bisphenol A and epichlorohydrin, resins obtained by epoxidation of novolak resins (produced from phenol and formaldehyde) with epichlorohydrin, polyfunctional epoxy resins such as tetraglycidyl-diaminodiphenyl methane, etc., and alicyclic epoxy resins such as bis(3,4-epoxy-6-methyl-cyclohexylmethyl)adipate, etc.

Unsaturated polyester resins, for example, resins obtained by reacting a mixture of saturated dibasic acids such as orthophthalic acid or isophthalic acid and unsaturated dibasic acids such as maleic acid anhydride or fumaric acid with diols such as propylene glycol, and resins produced by reacting bisphenol type or novolak type epoxy resins with methacrylic acid, etc.

Phenol resins, for example, novolak resins produced from phenol and formaldehyde, etc., and Polyimide resins, for example, resins obtained by reacting bismaleimide with a diamine, etc.

In the present invention, particularly excellent characteristics are exhibited using epoxy resins as the thermosetting resins. A resin composition of a thermosetting epoxy resin and an epoxy resin having a molecular weight of 5,000 or more is completely homogeneous and transparent upon hardening and the resulting moldings of the composite materials not only have an excellent appearance and tone but also have very excellent properties. Any deterioration of properties due to addition of the epoxy resin having a high molecular weight is hardly observed. One example of this type of epoxy resin/epoxy resin composition is a combination of resins prepared by condensation of bisphenol A and epichlorohydrin wherein the thermosetting resin having a softening point less than 60° C. is a resin having a polymerization degree less than about 15 and the other epoxy resin has a polymerization degree greater than 20 and a molecular weight greater than 5,000. It has been found that the molding cycle of this composition is remarkably shorter. The epoxy resin having a molecular weight of 5,000 or more increases the hardening rate of the composition markedly.

The properties of moldings containing carbon fibers are better with phenol novolak type resins than bisphenol A type resins because the adhesive strength to the carbon fibers is higher. It has similarly been found that excellent properties are obtained using unsaturated polyester prepolymers having structural units consisting of about 20 to 40 mol% of isophthalic acid, 80 to 40 mol% of fumaric acid and 100 mol% of propylene glycol as a glycol component and using diallylphthalate as a cross-linking monomer.

As epoxy resins having a molecular weight of 5,000 or more, it is preferred to use epoxy resins having a molecular weight of about 5,000 to 300,000, preferably about 10,000 to 200,000 and particularly 20,000 to 100,000. Here, the epoxy resins having a molecular weight of 5,000 or more are polyether resins having an epoxy group on both ends of the molecule or polyester resins having an epoxy group on both ends of the molecule. In particular, epoxy resins prepared from a polyhydric phenol such as bisphenol A, resorcinol, hydroquinone, etc., and epichlorohydrin are preferred. Among these, epoxy resins having the following structural formula are preferred:

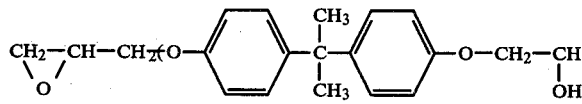 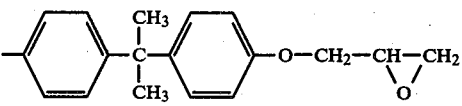

The above described resins are obtained by condensation of bisphenol A with epichlorohydrin. n is about 20 or more (n≧20). Resins in which n is 100 or more (n≧100) are so-called phenoxy resins.

Polyester resins having an epoxy group on both ends of the molecule may be obtained by reacting epichlorohydrin with dibasic acids. Representative examples of suitable epoxy resins include commercially available materials such as Epikote 1010 and Epikote OL-53-B-40 (produced by Shell Chemical Co.), DER 684-EK-40 (produced by Dow Chemical Co.), Araldite 488 (Ciba-Geigy Co.), Epiclon H-151, H-221 (produced by Dainippon Ink & Chemicals, Inc.), the above resins being the polyether type, Epiclon H-157, H-353 and H-360 (produced by Dainippon Ink & Chemicals, Inc.), etc.

If resins having a molecular weight of 5,000 or more are used alone, flexibility cannot be obtained because the products are too hard. Further, if the resins having a softening point of 60° C. or less are used alone, the products are too tacky. In accordance with the present invention both non-tackiness and flexibility are obtained for the first time using a combination of resins having the above-described molecular weight and resins having the above-described softening point.

A ratio of the epoxy resins having a molecular weight of 5,000 or more to the thermosetting resins having a softening point of 60° C. or less is about 5 to 60 parts by weight and preferably about 15 to 40 parts by weight of the epoxy resins per 100 parts by weight of the thermosetting resins. The amount of the strands is about 20 to 80% by volume, preferably about 30 to 70% by volume and particularly 40 to 65% by volume based on the volume of the strand prepreg.

The strands used in the present invention are fiber bundles composed of about 1,000 to 30,000 filaments having a diameter (of the filament) of about 5 to 200μ. As the filaments composing the strands, one or more fibers having light weight, high strength and high elasticity such as carbon fibers, silicon carbide fibers, boron fibers, glass fibers, aromatic polyamide fibers [such as poly-(p-aminobenzoic acid), poly-(p-phenylene terephthalic acid amide) (Kevlar Fiber, a product of E. I. Du Pont is on the market)] or metal fibers, etc., are used. The most preferred combination of resins and fibers in the present invention is that composed of fibers comprising carbon fibers, glass fibers or aromatic polyamide fibers, a thermosetting resin having a softening point of about 60° C. or less and an epoxy resin having a molecular weight of 5,000 or more. Articles prepared from this combination are of superior mechanical strength such as bending strength, interlaminar shear strength, etc.

As the fiber material impregnated with the resin composition of the present invention, strands are the most preferred from the standpoint of benefitting from the present invention. That is, using the resin composition of the present invention a strand prepreg can be wound on a bobbin and easily unwound without adhesion. However, chopped strands, cut fibers other short filaments, rovings, etc., can be used as reinforcing fibers since the resin composition of the present invention is not tacky. When such short fibers are used, though the releasing paper is not required, it is preferred to store them using a base in order to support the impregnated fibers.

Where the resin composition must be cross-linked to form a molded article, for example, when using unsaturated polyester resins, a cross-linking monomer may be incorporated in the resin composition of the present invention. Typical cross-linking agents are triallylcyanurate, diallylphthalate, methylmethacrylate, styrene and vinylacetate, etc. Such a monomer can be used in an amount of about 10 to 70 wt%, preferably 20 to 40 wt% based on the unsaturated polyester. A hardening catalyst may also be present in an amount of 0.1 to 10 wt% based on the unsaturated polyester. The resin composition of the present invention generally contains a hardening agent or accelerator for hardening in forming a molded article (e.g., a fishing rod or golf club shaft) from the strand prepreg. As a hardening agent or a hardening accelerator, it is possible to use hardening agents and hardening accelerators used hitherto for thermosetting resins and epoxy resins depending on the storage life of the prepreg or the properties of the composite. For example, acid anhydride type hardening agents such as tetrahydrophthalic acid anhydride or pyromellitic acid anhydride, etc., dicyandiamide and diaminodiphenyl sulfone, etc., are suitable as the hardening agent for epoxy resins. As hardening catalysts for unsaturated polyester resins, there are t-butylperbenzoate, t-butylperlaurate and t-butylpercrotonate, etc. A preferred hardening accelerator is 3-(3,4-dichlorophenyl)-1,1-N-dimethylurea when using dicyandiamide as the hardening agent for the epoxy resin. A suitable amount of these hardening agents for an epoxy resin is 1 to 10% by weight. An amount of the hardening accelerator added is 1 to 10% by weight. Prepregs having excellent properties which withstand heat treatment upon production thereof having a storage life of 2 months and a hardening temperature of 130° C. are obtained using dicyandiamide as the hardening agent for epoxy resins and 3-(3,4-dichlorophenyl)-1,1-N-dimethylurea as the hardening accelerator. Further, prepregs which withstand heat treatment upon production thereof and have a storage life of 2 weeks and a hardening temperature of 150° C. are obtained using tertiary butyl perbenzoate as the hardening catalyst for unsaturated polyester resins. The polyimide and phenol resins generally do not require a hardening agent because they harden by heat alone.

In producing the prepreg of the present invention, the strands may be impregnated with the resin composition in a melted state but it is preferred to dissolve the resin composition in a solvent and impregnate the strands with the resulting solution and dry. Acetone, methyl ethyl ketone, methylene chloride and dichloroethane may be used as the solvents, The solvent is used in such an amount that the concentration of the resins is about 10 to 40% by weight. After impregnating the strands with the solution of the resin composition, the solvent is evaporated, generally with hot air at about 100° to 200° C., preferably 100° to 120° C. for about 1 to 30 minutes, preferably 5 to 15 minutes. Evaporation must be carried out under conditions at which hardening of the thermosetting resins and epoxy resins does not begin.

The prepreg composition of the present invention can be easily molded and hardened to form rods, pipes or other shapes such as tennis rackets, propeller shafts for cars, fishing rods or golf shafts, etc., by rolling, placing them in a die or by the pulltrusion method (the pulltrusion method comprises pulling the strands impregnated with resin through a mold having a cross-section of various shapes to form articles) utilizing its flexibility without a resin impregnation step. Since the resin impregnation step is not required in carrying out molding, the process has advantages that the processing speed increases and the resin content in moldings can be correctly controlled. Further, it is possible to additionally add, if necessary, the resin composition of the present invention in carrying out molding or hardening of the prepreg composition.

Hardening is carried out at about 80° C. to 600° C., preferably 100° C. to 500° C., at 1 to 100 kg/cm², preferably 1 to 70 kg/cm² pressure. The hardening time is usually 5 minutes to 30 hours, preferably 10 minutes to 10 hours. In case of epoxy resin, it cross-links preferably at about 120° to 200° C., 1 to 30 kg/cm² pressure (further preferably 5 to 20 kg/cm²). A phenol resin cross-links preferably at about 120° to 180° C., 10 to 50 kg/cm² pressure, unsaturated polyester cross-links at about 120° to 180° C., 1 to 30 kg/cm² pressure, and an aromatic polyimide cross-links at about 150° to 400° C., 10 to 50 kg/cm² pressure.

The prepreg composition of the present invention is a non-tacky and flexible composition and has advantages that it not only has a good handling property and excellent moldability but also can be stored for a long period of time without hardening in a cold state, for example, for one month at 20° C., and for six months at −10° C.

The non-tackiness description used in this specification is used with respect to an adhesive test according to the following method at a temperature in the range of 15° to 40° C.

Method of evaluating tackiness

A strand prepreg is rolled on a paper cylinder having a diameter of 2 cm and a length of 15 cm by a winder. After allowing to stand for a complete day and night at 30° C., the strand prepreg is rewound under 500 to 700 g tension at a rate of 30 m/min. Tackiness is determined by whether the strand prepreg can be drawn smoothly from the paper cylinder without adhesion.

Further, flexibility is evaluated according to the following method.

Method of evaluating flexibility

Flexibility is determined by whether the strand prepreg fits around a rod having a diameter of 1 cm without damaging the fibers when it is rolled on the round rod at 18° to 25° C.

The present invention is now illustrated in more detail with reference to the following examples.

EXAMPLE 1

100 parts by weight of epoxy resin EPN 1138 (Ciba Geigy) which is semi-solid at a room temperature (a resin obtained by reacting phenol with formaldehyde and epichlorohydrin which is semi-solid at room temperature having a softening point of 30° to 35° C. and a viscosity of 35,000 to 70,000 cp at 50° C.) and 33 parts by weight, as resin content, of high molecular weight epoxy resin having an average molecular weight of about 80,000 (Epikote OL-53-B-40, produced by Shell Chemical Co. obtained by reacting bisphenol A with epichlorohydrin having a softening point of 150° C., which is commercially available as a solution in methyl ethyl ketone) were dissolved in acetone to produce a solution having a resin concentration of 35%. To this solution, a solution prepared by dissolving 3 parts by weight of dicyandiamide and 5 parts by weight of 3-(3,4-dichlorophenyl)-1,1-N-dimethylurea in methyl cellosolve was added to produce a homogeneous solution. Carbon fibers having a diameter of 7μ and 12,000 filaments in a strand, Besfight ® HTA-7-12000 produced by Toho Beslon Co., Ltd. were impregnated with resins by passing them through the resulting resin solution. When the solvent was removed by passing through a hot air heating furnace at 110° C. for 5 minutes, a strand prepreg which was not tacky at a temperature of 15° to 40° C. and was flexible was obtained. The resin content was 48% by weight and the residual solvent was 0.6%. After the strand prepregs were arranged in one direction and pressed at 100° C., 10 sheets of the resulting prepreg sheets were stratified and molded under the hardening conditions shown in Table 1 to produce a molding. Properties of the molding are shown in Table 1.

TABLE 1

| Property | Hardening Conditions | | | | | |
|---|---|---|---|---|---|---|
| | Temperature (°C.) 120 | Pressure (kg/cm²) 7 | Time (min) 90 | Temperature (°C.) 120 | Pressure (kg/cm²) 7 | Time (min) 20 |
| Bending Strength (kg/mm²) | 135 | | | 117 | | |
| Bending Modulus of Elasticity (T/mm²) | 11.0 | | | 9.5 | | |
| Interlaminar Shear Strength (ILSS) (kg/mm²) | 9.0 | | | 8.4 | | |
| Vf (volume of fiber %) | 54 | | | 46 | | |

In the case of using dicyandiamine/2-(3,4-dichlorophenyl)-1,1-N-dimethylurea type hardening agent, it has been understood that satisfactory properties are obtained even if the hardening time is 20 minutes, though about 90 minutes hardening time is generally required.

EXAMPLE 2

A strand prepreg was produced in the same manner as in Example 1 using the same amount of DER 684-EK-40 (Dow Chemical Co.) having a molecular weight of 35,000 (a resin obtained by reacting bisphenol A with epichlorohydrin) instead of the high molecular weight epoxy resin Epikote OL-53-B-40 in Example 1. Thus, a strand prepreg which was not tacky at room temperature but was flexible was obtained. Properties of this strand prepreg were measured in the same manner as in Example 1. Properties of moldings produced by changing the hardening condition (temperature) are shown in Table 2.

TABLE 2

| Property | Hardening Conditions | | | | | |
|---|---|---|---|---|---|---|
| | Temperature (°C.) 120 | Pressure (kg/cm²) 7 | Time (min) 90 | Temperature (°C.) 120 | Pressure (kg/cm²) 7 | Time (min) 20 |
| Bending Strength (kg/mm²) | 154 | | | 139 | | |
| Bending Modulus of Elasticity (T/mm²) | 11.9 | | | 11.0 | | |
| I.L.S.S. (kg/mm²) | 8.8 | | | 8.6 | | |
| Vf (%) | 57 | | | 53 | | |

A molding having sufficiently satisfactory properties was obtained even by hardening only 20 minutes.

EXAMPLE 3

A resin composition having a softening point of 37° C. composed of 100 parts by weight of an unsaturated polyester prepolymer composed of 40% by mol isophthalic acid, 60% by mol fumaric acid and 100% by mol propylene glycol, 24 parts by weight of diallylphthalate and 6 parts by weight of a hardening catalyst (tertiary butyl perbenzoate) and 35 parts by weight, as the solid content, of high molecular weight epoxy resin, Epikote OL-53-B-40 (Shell Chemical Co.) were dissolved in acetone to produce a 32% solution. When the strand prepreg was produced using this resin solution in the same manner as in Example 1, an excellent prepreg which was not tacky was obtained. Using this prepreg, a prepreg sheet was produced in the same manner as in Example 1, which was stratified and molded at 150° C., 7 kg/cm² pressure for 60 minutes. The properties of the resulting molding were as follows.

| | |
|---|---|
| Bending Strength | 119 kg/mm² |
| Bending Modulus of Elasticity | 9.0 T/mm² |
| I.L.S.S. | 8.2 kg/mm² |
| Vf | 45% |

COMPARISON EXAMPLE 1

A strand prepreg was produced using a resin composition comprising Epikote 1009 having a molecular weight of about 3,750 instead of Epikote OL-53-B-40 in Example 1. The resulting strand prepreg was flexible but it was tacky and difficult to handle when rolling on a bobbin because the one roll of strand prepreg adhered to another.

COMPARISON EXAMPLE 2

When a strand prepreg was produced using a resin composition comprising 10 parts by weight of epoxy resin EPN 1138 (Ciba Geigy) which was semi-solid at room temperature, 85 parts by weight of DEN 439 having a softening point of 48° to 58° C. and 5 parts by weight of epoxy resin Epikote 828 which was liquid at room temperature and had a molecular weight of 380 (Shell Chemical Co.), the flexibility thereof was somewhat inferior. In the case of rolling on a bobbin, the strand prepreg could not be drawn smoothly from the bobbin because it adhered mutually.

The results of Examples 1 to 3 and Comparison Examples 1 and 2 are shown together in Table 3.

TABLE 3

| Example No. | Tackiness | Flexibility |
|---|---|---|
| Example 1 | No | Good |
| Example 2 | No | Good |
| Example 3 | No | Good |
| Comparison Example 1 | Some | Good |
| Comparison Example 2 | Some | Poor |

While the invention has been described in detail and with reference to specific embodiments thereof, it will be apparent to one skilled in the art that various changes and modifications can be made therein without departing from the spirit and scope thereof.

What is claimed is:

1. A flexible, non-tacky strand prepreg which comprises (i) a resin composition comprising 100 parts by weight of thermosetting resin having a softening point of about 60° C. or less and about 5 to 60 parts by weight of an epoxy resin having an average molecular weight of about 10,000 or more and (ii) about 20 to 80% by volume strands, wherein said strands are impregnated with said resin composition.

2. The strand prepreg of claim 1, wherein the strands are carbon fibers, boron fibers, metal fibers, silicon carbide fibers, glass fibers, or aromatic polyamide fibers.

3. The strand prepreg of claim 1, wherein the thermosetting resin comprises at least one member selected from the group consisting of an epoxy resin, an unsaturated polyester resin, a phenol resin and a polyimide resin.

4. The strand prepreg of claim 1, wherein the thermosetting resin comprises an epoxy resin, a hardening agent and a hardening accelerator.

5. The strand prepreg of claim 1, wherein the thermosetting resin comprises an unsaturated polyester resin, a cross-linking monomer and a hardening catalyst.

6. The strand prepreg of claim 1, wherein the thermosetting resin comprises phenol novolak type epoxy resins and the strands comprise carbon fibers.

7. The strand prepreg of claim 1, wherein the thermosetting resin comprises an unsaturated polyester prepolymer composed of isophthalic acid, fumaric acid and polypropylene glycol, a cross-linking monomer and a hardening catalyst, and the strands comprise carbon fibers.

8. The strand prepreg of claim 1, wherein the thermosetting resin comprises epoxy resins.

9. The strand prepreg of claim 1, wherein the epoxy resin is a resin obtained by condensing bisphenol A and epichlorohydrin.

10. The strand prepreg of claim 1, wherein the strands are present in an amount of about 30 to 70% by volume.

11. The strand prepreg of claim 1, wherein the strands are carbon fibers, glass fibers, aromatic polyamide fibers or a combination thereof.

12. The strand prepreg of claim 1, wherein said thermosetting resin has a softening point of about 40° C. or less and a viscosity of 100 poise or more at 25° C.

13. The strand prepreg of claim 1, wherein said thermosetting resin is a phenol novolak resin and said strand is composed of carbon fibers.

14. The strand prepreg of claim 1, wherein said thermosetting resin is an epoxy resin and said resin composition is homogeneous.

15. The strand prepreg of claim 1, wherein said epoxy resin has an average molecular weight of about 10,000 to 200,000.

16. The strand prepreg of claim 1, wherein said epoxy resin has an average molecular weight of about 20,000 to 100,000.

17. A process for forming an article which comprises stratifying one or more layers of a flexible non-tacky strand prepreg which comprises a resin composition comprising 100 parts by weight of thermosetting resin having a softening point of 60° C. or less and about 5 to 60 parts by weight of epoxy resin having an average molecular weight of 10,000 or more and about 20 to 80% by volume strands, wherein said strands are previously impregnated with said resin composition, and hardening the resin composition at about 80° to 600° C. and at about 1 to 100 kg/cm$^2$ pressure.

18. The process of claim 17, wherein said thermosetting resin is an epoxy resin and said resin composition is homogeneous.

* * * * *